United States Patent [19]

Gorynin et al.

[11] Patent Number: 5,204,302

[45] Date of Patent: Apr. 20, 1993

[54] CATALYST COMPOSITION AND A METHOD FOR ITS PREPARATION

[75] Inventors: Igor V. Gorynin; Boris V. Farmakovsky; Alexander P. Khinsky; Karina V. Kalogina, all of Leningrad, U.S.S.R.; Alfredo R. V., Caracas, Venezuela; Julian Szekely, Weston; Navtej S. Saluja, Cambridge, both of Mass.

[73] Assignee: Technalum Research, Inc., Cambridge, Mass.

[21] Appl. No.: 755,076

[22] Filed: Sep. 5, 1991

[51] Int. Cl.⁵ .................... B01J 35/00; B01J 37/34
[52] U.S. Cl. .................................. 502/2; 502/1; 502/5; 502/527
[58] Field of Search .................... 502/5, 87, 177, 439, 502/1, 2, 527

[56] References Cited

U.S. PATENT DOCUMENTS

| | | | |
|---|---|---|---|
| 3,264,226 | 8/1966 | Johnson | 502/5 |
| 3,492,148 | 1/1970 | Hervert | 502/439 |
| 4,252,690 | 2/1981 | Kanya et al. | 252/470 |
| 4,455,281 | 6/1984 | Ishida et al. | 422/171 |
| 4,465,654 | 8/1984 | Faschinghauer | 423/213.5 |
| 4,702,897 | 10/1987 | Onal | 423/213.5 |
| 4,703,028 | 10/1987 | Steininger | 502/177 |
| 4,752,599 | 6/1988 | Nakamura et al. | 502/438 |
| 4,778,649 | 10/1988 | Niino et al. | 419/9 |

FOREIGN PATENT DOCUMENTS

| | | | |
|---|---|---|---|
| 0142858 | 6/1985 | European Pat. Off. | |
| 283910 | 9/1988 | European Pat. Off. | 502/439 |
| 48992 | 5/1978 | Japan | 502/177 |
| 58-017840 | 2/1983 | Japan | |

(List continued on next page.)

OTHER PUBLICATIONS

E. S. Lox et al., "Development of Scavenger-Free Three-Way Automotive Emission Control Catalysts with Reduced Hydrogen Sulfide Formation", SAE Technical Paper Series, pp. 1–11, presented at the International Congress and Exposition, Detroit, Michigan (Feb. 27–Mar. 3, 1989).

E. Koberstein et al., "Catalytic Automotive Exhaust Purification–The European Situation 1985", SAE Tech- (List continued on next page.)

Primary Examiner—Carl F. Dees
Attorney, Agent, or Firm—Choate, Hall & Stewart

[57] ABSTRACT

A multi-layered catalyst on a metal substrate and a method for its preparation is provided. The catalyst includes a substrate, an adhesive sublayer whose improved adhesion to the substrate is obtained by the formation of a diffusion layer between the substrate and adhesive layer, a catalytically active layer deposited on the adhesive sublayer characterized by a smooth compositional gradient of the catalytically active component such that the catalytically active layer ranges from substantially 0.0 wt % at the adhesive sublayer interface to substantially 100 wt % at the outermost portion of the catalytically active layer and a porous layer containing at least the catalytically active component. An activator coating can be applied to the porous layer. The catalyst is prepared by plasma spraying a thermally reactive powder onto the substrate to form the adhesive sublayer, whereby the heat generated by the thermally reactive powders causes diffusion of the sublayer into the substrate and a diffusion bonded layer is formed resulting in a strong adhesion of the sublayer to the substrate, subsequently introducing at least alumina and a second powder into a plasma torch at separately controllable variable feed rates and co-depositing alumina and the second powder, adjusting the relative feed rates of alumina and second powder into the plasma torch such that a catalytically active layer with a smooth compositional gradient is achieved, whereby the alumina content of the catalytically active layer ranges from substantially 0 wt % at the adhesive sublayer interface to substantially 100 wt % at the uppermost portion of the catalytically active layer, subsequently introducing at least alumina and an additional metal carbonate or hydroxide into the plasma torch; and co-depositing a porous layer of at least alumina and the additional metal carbonate or hydroxide, whereby the metal carbonate or hydroxide decomposes with a release of gas or vapor resulting in an outer coating with a high surface area.

59 Claims, 5 Drawing Sheets

FOREIGN PATENT DOCUMENTS 61-207566  9/1985  Japan.
61-207567  9/1985  Japan.
61-047137  3/1986  Japan.
61-043973  9/1986  Japan.
61-047137  10/1986  Japan.
61-222541  10/1986  Japan.
63-143939  6/1988  Japan.

OTHER PUBLICATIONS

*nical Paper Series*, pp. 1–9, presented at the International Fuels and Lubricants Meeting and Exposition, Tulsa, Oklahoma (Oct. 21–Oct. 24, 1985).

Elizabeth A. Bretz, "Lower Limits on Engine Emissions Force Post-Combustion Treatment", *Power*, pp. 65–68 (May 1989).

CATALYST COMPOSITION AND A METHOD FOR ITS PREPARATION

BACKGROUND OF THE INVENTION

The present invention relates to a multi-layered catalyst on a metal substrate for the catalytic conversion of gases, such as the purification of exhaust gases of internal combustion engines. The present invention further relates to a method for producing a catalyst.

Catalysts for the purification of waste gases from an internal combustion engine or other industrial processes typically include a thermally resistant metal substrate, an alumina interlayer and a catalytically active layer containing platinum. The catalytically active materials of the interlayer and catalytically active layer purify exhaust gases such as CO, $CH_x$ and $NO_x$. In known catalysts, delamination of the coating from the substrate is a common source of failure.

Stronger bonding of the alumina interlayer to the substrate is possible if an adhesive sublayer, which contains an element also found in the substrate, is deposited between the two layers. However, at the high service temperatures typically encountered in an internal combustion engine, the catalytically active layer is susceptible to failure at the sublayer/active layer interface.

Metal-ceramic interfaces are weak points in the composite. Dissimilar materials are sites for mechanical stress concentrations and often nucleate the failure process. Mechanical properties of the interface often control the overall function of the coated catalyst. Therefore, improving the mechanical properties of the interface can result in a prolonged life for the entire article.

Known catalysts still need a relatively large amount of noble metals to achieve sufficiently high conversions of CO, $CH_x$ and $NO_x$. In 1989, Europe consumed 26 tons of platinum, most of which was used by the automobile industry in catalytic converters. Since metals of the platinum group are expensive and limited in resources, it is desirable to reduce the noble metal content of the catalyst without sacrificing catalytic efficiency.

It is the object of the present invention to provide a catalyst with a strong bond to the metal substrate which is stable to thermal and mechanical shocks. It is a further object of the present invention to provide a catalyst with improved catalytic activity while reducing the noble metal content in the active layer.

It is a further object of the present invention to provide a method of preparing a catalyst with improved thermal and mechanical stability and enhanced catalytic activity.

SUMMARY OF THE INVENTION

In one aspect of the present invention, a catalyst is provided which includes a substrate, onto which an adhesive sublayer is deposited. Improved adhesion of the substrate is obtained by formation of a diffusion layer between the substrate and the adhesive sublayer. A catalytically active layer which is characterized by a smooth compositional gradient of the catalytically active component in the layer is deposited on the adhesive sublayer. The composition of the catalytically active component ranges from substantially 0 wt % at the adhesive sublayer interface to substantially 100 wt % at the outermost portion of the catalytically active layer. The balance of material is substantially similar to the components of the adhesive sublayer. A porous layer is deposited on the catalytically active layer which contains a catalytically active component and other metal oxides. In a preferred embodiment, the catalyst additionally has an activator coating on the porous layer.

In another aspect of the present invention, a catalyst for the conversion of waste gases from an internal combustion engine is provided including a thermally stable metal substrate onto which an adhesive sublayer containing aluminum is deposited. Improved adhesion of the substrate is obtained by formation of a diffusion layer between the substrate and the adhesive sublayer. A catalytically active layer containing an active form of alumina as the active component is deposited on the adhesive sublayer which is characterized by a smooth compositional gradient of active-alumina in the layer. The composition of active-alumina ranges from substantially 0 wt % at the adhesive sublayer interface to substantially 100 wt % at the outermost portion of the catalytically active layer. The balance of material is substantially similar to the components of the adhesive sublayer. A porous layer is deposited on the catalytically active layer which contains active-alumina and other metal oxides. A fine layer of activator such as platinum group metals is deposited onto the porous layer.

In preferred embodiments, the adhesive sublayer is prepared from thermally reactive powders. A thermally reactive powder is one whose reaction, once thermally initiated, will self-propagate. A thermally reactive powder is one that reacts exothermically and whose reaction, once initiated, is self-propagating. Thermally reactive powders include those prepared from nickel and titanium, aluminum with at least one or more of Co, Cr, Mo, Ta, Nb, Ti or Ni or silicon with at least one or more of Ti, Nb, Cr, W, Co, Mo, Ni or Ta.

For purification of waste gases from combustion processes, thermally reactive powders are preferably composites of aluminum and a second metal, such as Co, Cr, Mo, Ta, Nb, Ti or Ni. The metal is most preferably nickel. The thermally reactive powders react during deposition to form an intermetallic compound.

The catalytically active layer can contain any material which performs a catalytic function. In the purification of waste gases, the catalytically active layer is prepared from alumina and the thermally reactive powder used in the deposition of the adhesive sublayer. Active alumina is a mixture of γ-alumina and amorphous alumina. Stabilizers can also be added to the catalytically active layer to provide thermal stability to the active phases of alumina. Additionally, the catalytically active layer can contain other catalysts that enhance or broaden the catalytic activity of the catalyst. Such additional catalysts typically are metal oxides, metal carbides and free carbon.

The catalytically active layer is compositionally graded such that the content of the active component is substantially 0 wt % at the sublayer interface and substantially 100 wt % at the outermost surface. The gradient can be linear or exponential. The slope of the curve is determined by the compatibility of the materials of the active layer.

A porous coating is provided on the catalytically active layer which is prepared from active alumina and at least one pore-forming compound. The pore-forming compounds are metal carbonates and hydroxides which decompose to the corresponding metal oxide on the catalyst surface. The thermal decomposition temperature of the metal carbonates and hydroxides is less than the $\gamma$-Al$_2$O$_3$·$\alpha$-Al$_2$O$_3$ transition temperature. The porous layer has a surface area in the range of 30-50 m$^2$/g. The porous layer serves as the support for the activator, which can be a platinum group metal or a metal oxide, metal carbide or zeolites.

Another aspect of the present invention is a method for preparing a catalyst using plasma spray techniques that is mechanically and catalytically superior to those of the art. A thermally reactive powder is introduced into a plasm torch and an exothermic reaction is initiated in the torch. The exotherming powders impinge the substrate where the reaction continues. The heat generated in the reaction causes diffusion of the sublayer into the substrate resulting in a diffusion bond and strong adhesion of the sublayer to the substrate.

Subsequently, the catalytically active layer is formed by introducing alumina and a second powder into the plasma torch at separately controllable variable feed rates. The second powder has substantially the same composition as the thermally reactive powders used in the formation of the sublayer. The relative feed rates of alumina and the second powder is adjusted so that a smooth continuous compositional gradient is achieved such that the alumina content is substantially 0 wt % at the adhesive sublayer interface and substantially 100 wt % at the outermost portion of the catalytically active layer.

In the next step, the porous layer is formed by introducing at least alumina and an additional metal carbonate or hydroxide into the plasma torch and co-depositing them onto the catalytically active layer. The metal carbonate or hydroxide is heated in the flame, whereby a vapor or gas is evolved, the escape of which generates pores and voids in the porous layer.

An activator can further be applied to the surface of the porous layer using chemical deposition or physical vapor deposition techniques. The porous layer provides a large surface area on which the catalytic purification of waste gases can be carried out. Therefore, only a thin layer of activator, such as metals from the platinum group, metal carbides or metal oxides, are needed.

The activator can be deposited using magnetron sputtering. Multiple cathodes are provided and the catalyst surface is moved sequentially past each cathode to deposit an increasingly thicker layer of activator. If the deposition occurs in a vacuum or inert atmosphere, pure metal is deposited. If the deposition occurs in air, metal oxides are deposited. In carburizing atmospheres, metal carbides are provided. Multi-layer deposition is realized by using cathodes of different composition.

Zeolites are also used as activators. Because they have inherent porosity, no porous layer is needed and they can be deposited directly on the catalytically active layer. Zeolites are deposited by plasma spraying.

The catalyst according to the present invention is flexible and strong. It exhibits superior catalytic behavior in the treatment of CO, CH$_x$ and NO$_x$. Because of the strong adhesion of the catalyst layers to the substrate, the catalyst can be corrugated and punched after deposition of the catalyst layers. The catalyst composition of the present invention can therefore form a coating of uniform thickness because the deposition process is not limited to coating after substrate forming.

DESCRIPTION OF THE PREFERRED EMBODIMENT

The catalyst composition of the present invention can be used for many applications such as purifying waste gases from industrial processes and internal combustion engines and catalyzing gas phase reactions in chemical processes. The catalyst composition can be made from any material provided that the adhesive sublayer is diffusion-bonded onto the substrate, the catalytically active layer exhibits a smooth continuous compositional gradient such that there are no abrupt changes in composition along the thickness profile and the porous layer provides a large surface area on which the catalyzed reaction can proceed. An optional activator coating can be applied to the porous coating which further enhances the catalytic performance of the catalyst. However, the coating is not needed in every instance.

Figure 1:
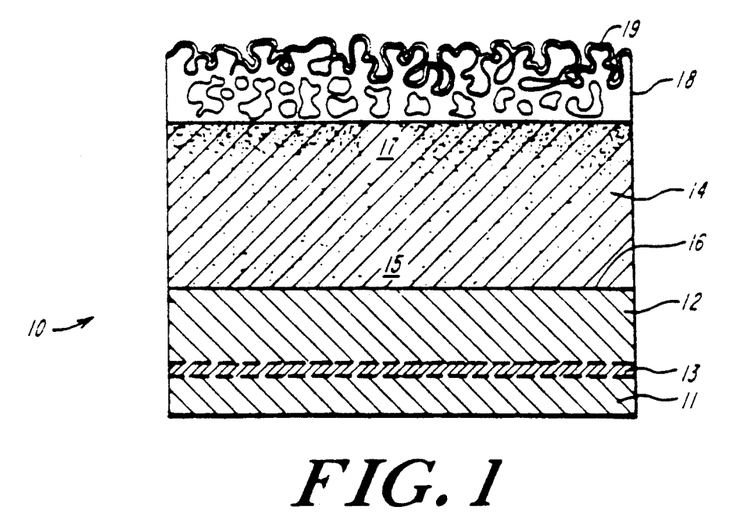
FIG. 1 is a cross-sectional view of the catalyst as prepared according to the present invention.

Referring to FIG. 1 which shows a cross-sectional view of the catalyst composition 10 of the present invention, a substrate 11 is covered with an adhesive sublayer 12 which is strongly bonded to the substrate 11 by a diffusion layer 13. The diffusion layer 13 is formed during deposition, when the high temperatures generated by the exothermic reaction of the thermally reactive powder cause diffusion of substrate 11 and sublayer 12 material across the interface. A catalytically active layer 14 is deposited on sublayer 12 which is characterized by a smooth compositional gradient of the catalytically active material. In a region 15 near a sublayer/active layer interface 16, the catalytically active layer 14 has substantially the same composition as the sublayer 12. In a region 17 near the outermost layer of the catalytically active layer, the layer 14 has a composition substantially that of the catalytically active component. The gradual change in composition of the catalytically active layer 14 makes it exceptionally stable to thermal shock because there is no abrupt change in composition and hence no sites for stress concentration. A porous layer 18 is applied to the layer 14 which provides a very large surface area on which catalytic reactions take place. An optional activator coating 19 can be applied to the porous layer. An activator increases the rate of reaction of the catalyst. This is necessary for catalytic converters, where the dwell time in the converter is very short. However, the use of an activator coating may not be needed in other industrial applications where there is sufficient contact of the reactants with the catalyst.

The substrate can be any metal provided that it is thermally stable. Catalyst coatings have been prepared on substrates of stainless steel (0.1% C; 13% Cr) and low alloy steel (0.1% C) with no appreciable difference in the performance of the bonded layers.

The adhesive sublayer contains a self-bonding intermetallic compound formed from nickel and titanium, aluminum with at least one or more of Co, Cr, Mo, Ta, Nb, Ti or Ni, or silicon with at least one or more of Ti, Nb, Cr, W, Co, Mo, Ni or Ta. The adhesive sublayer is generally less then 50 μm thick.

The catalytically active layer includes at least the catalytically active component and the thermally reactive powders from the sublayer. In the catalyst for purification of waste gases, the catalytically active component can be alumina, more preferably γ-alumina and amorphous alumina and can further contain stabilizers such as CaO, $Cr_2O_3$, $Mn_xO_y$, $ZrO_2$, $SnO_2$, $Ti_xO_y$, $Si_xO_y$, and oxides of rare earth elements. Additional catalytically active components are present in the layer which can be metal oxides, metal carbides and free carbon. Suitable catalytically active compounds include $ZrO_2$, $Ce_2O_3$, $SnO_2$, MgO, $Mn_xO_y$, $Ti_xO_y$, $Cr_2O_3$, $Co_2O_3$, $Cu_xO_y$, $Fe_2O_x$, NiO, BaO, $V_2O_5$, WC, MoC, oxides of rare earth elements, complex spinel oxides and perovskite-type oxides. The catalytically active layer is typically 20–50 μm thick. At thicknesses much greater than 50 μm, the mechanical properties (strength) of the layer degrade.

The porous layer contains catalytically active component and transition metal oxides. Metal oxides are decomposition products of pore-forming compounds, such as $MnCO_3$, $Na_2CO_3$, $MoCO_3$ and rare earth oxides. The porous layer is substantially ⅓ the thickness of the catalytically active layer. Thinner layers are not mechanically strong, while thicker layers exhibit reduced catalytic activity.

It is known that flame sprayed or plasma sprayed metal or metal oxide powders can be applied in varying thicknesses to a variety of metallic substrates. The flame spraying of these materials includes feeding the powder particles through a high temperature flame of about 3000° C. where they are softened and subsequently deposited onto a substrate. This invention uses these known high temperature spraying systems in a deposition process such that the method of depositing these powders imparts highly desirable properties to the final article.

Figure 2:
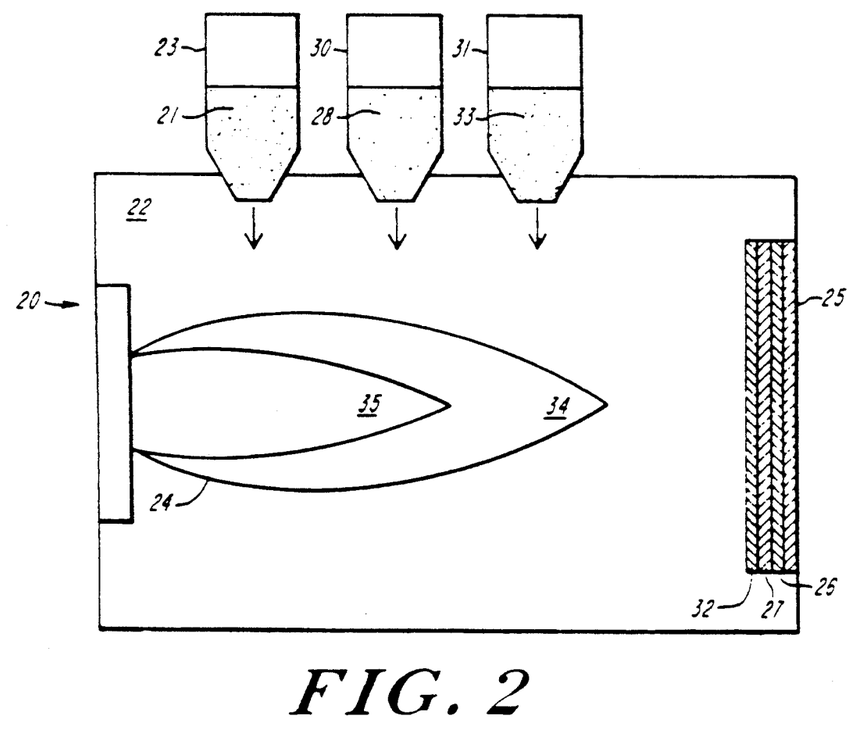
FIG. 2 shows the plasma spray deposition of the layers of the catalyst composition of the present invention.

FIG. 2 illustrates a plasma spray apparatus 20 used in the method of the present invention. A thermally reactive powder 21 is introduced into a deposition chamber 22 from a feeder 23. Means of controlling the atmosphere within the chamber is provided (not shown). The powder 21 is directed into a stream of a plasma torch flame 24 and deposited onto a substrate 25 to form a sublayer 26. The heat of the plasma torch flame 24 initiates an exothermic reaction in the powder 21. Upon deposition onto the substrate 25, the reaction continues to generate heat. The heat generated in such close proximity to the substrate/sublayer interface promotes diffusion across the interface.

The thermally reactive powder 21 is a composite powder of nickel and titanium, aluminum with one or more of Co, Cr, Mo, Ta, Nb, Ti or Ni, or Si with one or more of Ti, Nb, Cr, W, Co, Mo, Ni or Ta. In catalysts for the purification of waste gases, the thermally reactive powder is preferably a composite powder prepared from aluminum and one or more of Co, Cr, Mo, Ta, Nb, Ti or Ni. Nickel is a most preferred metal because of the large amount of heat generated upon its reaction with aluminum. With the rigorous exclusion of oxygen, several intermetallic compounds are possible in the reaction of aluminum and nickel (eq 1).

$$Ni + Al \rightarrow NiAl_3 + Ni_2Al_3 + NiAl + Ni\text{-}Al \text{ solid solution} \quad (1)$$

The heat of formation, $\Delta H_f$, and hence the amount of heat generated, Q, is different for each compound. $Ni_3Al$ has the greatest heat of formation. If air is used in the plasma chamber, nickel and aluminum oxides are also formed. The two metals are in intimate contact with one another, thus promoting the reaction of the two metals with each other. The relative proportion of metal to aluminum can be varied to obtain different intermetallic compounds and hence, different Q. For example, when the substrate is thermally stable such as a metal, then a metal to aluminum ratio is chosen so as to maximize the formation of $Ni_3Al$ and maximize Q to increase diffusion across the interface. It is desirable to have some unreacted metal in the layer to improve ductility and flexibility of the layer.

Figure 3:
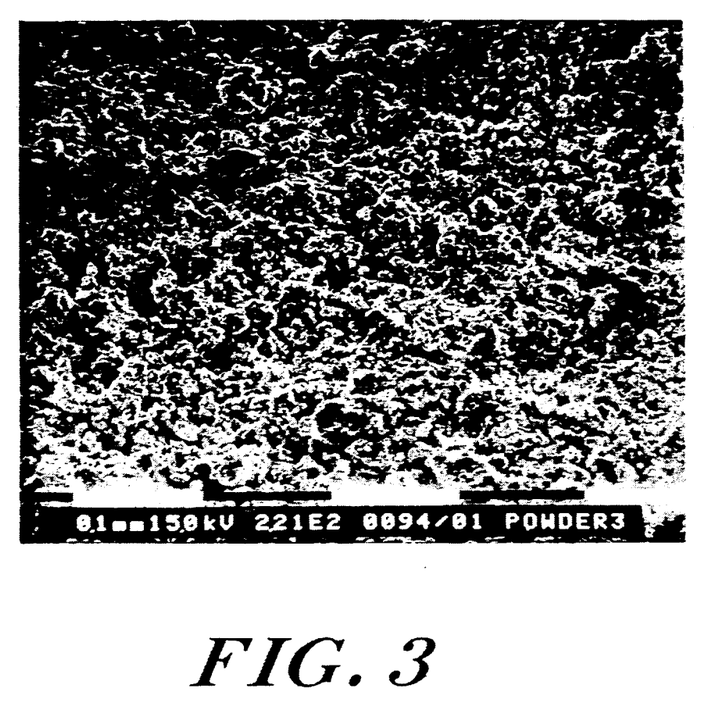
FIG. 3 is a scanning electron photomicrograph of the deposited adhesive sublayer of the catalyst composition of the present invention.

FIG. 3 shows photomicrograph of a Ni-Al adhesive layer produced according to the method of the invention. It is well-bonded to the substrate.

Figure 4:
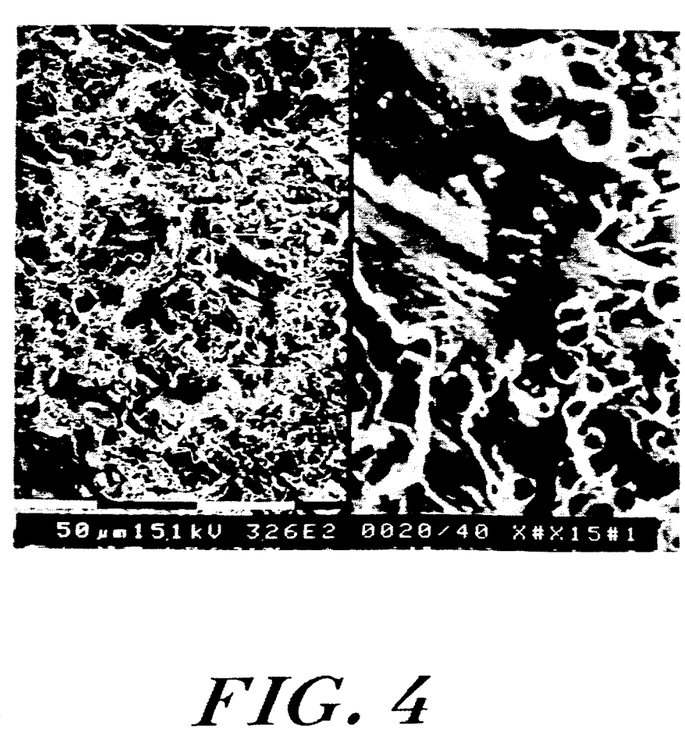
FIG. 4 is a scanning electron photomicrograph of the deposited catalytically active layer of the catalyst composition of the present invention.

After the adhesive layer has been deposited, the catalytically active component can be introduced from a second feeder. Referring to FIG. 2, a catalytically active layer 27 is deposited. A thermally reactive powder 21 is introduced into a deposition chamber 22 from a feeder 23 which is equipped with means of controlling the powder feed rate (not shown). A second powder 28 containing a catalytically active component 36 is introduced into the deposition chamber 22 from a feeder 29 which is also equipped with means of controlling the powder feed rate (not shown). Powders 21 and 28 are directed into a stream of a plasma torch flame 24 where they melt or at least soften. They are then accelerated onto an adhesive layer 26 that is on a substrate 25 where they form the catalytically active layer 27 of the present invention. The compositional gradient of the layer 27 is achieved by varying the relative amounts of powders 21 and 28 from substantially only powder 21 at the sublayer interface to substantially only powder 28 at the outermost surface of layer 27. FIG. 4 shows a photomicrograph of a catalytically active layer containing γ-alumina and amorphous alumina prepared according to the method of the invention.

The steepness of the compositional gradient is a function of the difference in physical properties such as the coefficients of thermal expansion for powders 21 and 28. The stress generated by each incremental change in composition must be small enough so that there is no failure during use. If the difference in thermal expansion coefficients is large, the gradient must be small to minimize stress. If the difference in thermal expansion coefficients is small, then the gradient can be steeper with no detrimental affect to the performance of the layer. An exponential compositional gradient is most preferred, although gradients that vary by any other function are possible. It is also possible to prepare layers with fluctuating gradients, that is, with the cyclic increasing and decreasing of powders 21 and 28.

There are two sources of alumina in the catalytically active layer. The majority of the alumina comes from the feed alumina in the second feeder. However, when air is the plasma-forming gas, some aluminum in the Ni-Al powders is also converted to alumina. Further control of the compositional gradient of the layer can therefore be achieved by introducing an oxygen gradient during deposition of the catalytically active layer.

It is also possible to incorporate additional powders into the catalytically active layer. These powders can be added directly to the alumina in feeder 30 or can be added separately in a third feeder 31.

When a catalyst for the purification of waste gases is prepared, the catalytically active component contains alumina. Although the feed alumina powders typically contain about 80% γ-alumina (the remainder being more thermodynamically stable α-alumina), the final catalytically active layer contains a mixture of γ-phase and amorphous alumina. At high temperatures active alumina represented by amorphous and γ-alumina generally turns into more stable α-alumina which has a much smaller specific surface area. The formation of active alumina occurs because of the rapid cooling on the substrate. Care must be taken once it has formed not to expose the catalytically active layer to excessive heat or conversion to the α-phase will occur. Stabilizers are added to improve the thermal stability of the γ-alumina and amorphous alumina phases and are typically added to alumina in feeder 30. The catalyst can be exposed to higher temperatures with less conversion to α-alumina once stabilized. Suitable stabilizers include CaO, $Cr_2O_3$ and $Mn_xO_y$, $ZrO_2$, $SnO_2$, $Ti_xO_y$, $Si_xO_y$ and oxides of rare earth elements.

Additional powders are added to act as catalysts to broaden and enhance the catalytic activity of the catalyst layer. Suitable additional catalysts for the purification of waste gases are $ZrO_2$, $Ce_2O_3$, $SnO_2$, MgO, $Mn_xO_y$, $Ti_xO_y$, $Cr_2O_3$, $Co_2O_3$, $Cu_xO_y$, $Fe_2O_x$, NiO, BaO, $V_2O_5$, WC, MoC, free carbon, oxides of rare earth elements, complex spinel oxides and perovskite-type oxides. In particular, $ZrO_2$, WC and MoC help improve the $NO_x$ reduction efficiency of the catalyst. Additional catalysts are usually added to the alumina and introduced into the plasma torch from feeder 30.

Figure 5:
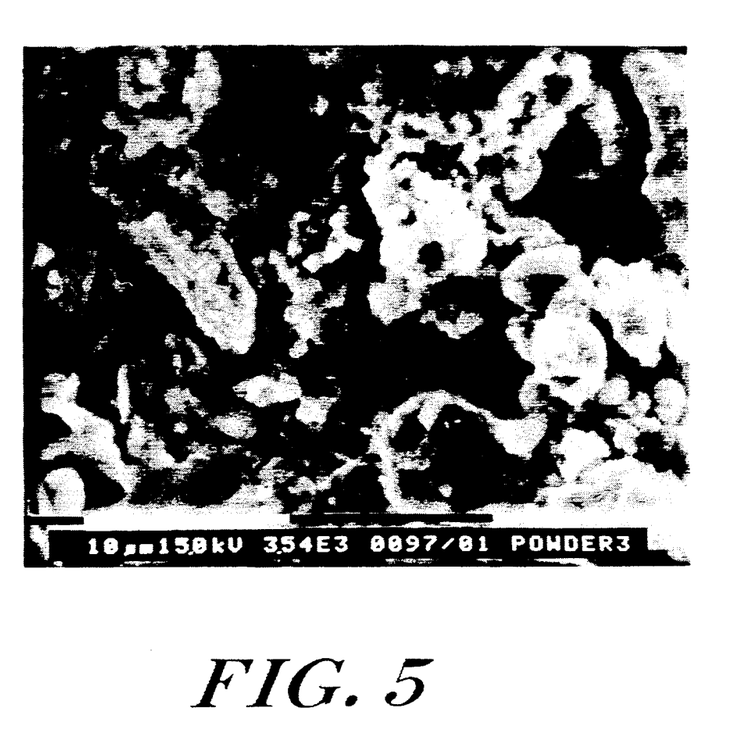
FIG. 5 is a scanning electron photomicrograph of the deposited porous layer of the catalyst composition of the present invention.

Referring to FIG. 2, porous layer 32 is also prepared using the apparatus of FIG. 2. The feeding of powder 21 stops, but powder 28 continues to feed into the chamber 22. A pore-forming powder 33 is introduced into the chamber 22 from the third feeder 40. Such pore-forming powders are metal carbonates or hydroxides that give off gas or vapor during decomposition, such as $MgCO_3$, $Na_2CO_3$, carbonates of rare earth elements and Al(OH)$_3$. The ratio of catalytically active component to pore-forming compound is 2.0-1.5:1. At less than a ratio of 1.5 and the porosity of the resulting layer is less than 30 m$^2$/g. At a ratio of greater than 2.0, the mechanical properties of the coating start to degrade. Porosities of 30 to 50 m$^2$/g are desirable. FIG. 5 shows a photomicrograph of the porous layer prepared from $MnCO_3$ and $Al_2O_3$.

Any metal carbonate and hydroxide can be used, such that the thermal decomposition temperature of said metal carbonates and hydroxides is less than the operating conditions of the catalyst. In the case of a waste gas purifying catalyst, the decomposition temperature of the pore-forming compound should be less than the γ→α transition temperature of γ-$Al_2O_3$ (~940° C.), including thermally stabilized γ-$Al_2O_3$. By releasing $CO_2$ or $H_2O$ at the surface, pores and cavities are formed. The metal carbonate decomposes to a metal oxide. It is preferred that the resulting oxide further be suitable as a stabilizer or additional catalyst, thereby avoiding contamination of the layer with undesirable decomposition products.

Some pore-forming elements, carbonates in particular, can decompose completely in the heat of the plasma torch prior to deposition. Their use in generating porosity is therefore limited. To minimize premature decomposition of the metal carbonate or hydroxide, the powder is fed into a cool zone 34 of the plasma torch. Alternately, the lifetime of the powder in the torch can be reduced by feeding the powder into the flame closer to the substrate target. It is desirable to have less than 50% premature decomposition of the pore-forming material 33.

Porosity can be controlled in other ways. In some instances, particle size of the powders can be controlled since different packing densities are obtained with different particle size distributions. Also, the plasma flame is not of one uniform temperature. If powders are fed into a hot zone 35 near the center of the flame, they will exit the flame with a higher velocity than powders fed into the cooler zone 34 of the flame. When particles impinge the substrate at higher velocities, the porosity of the resulting layer is reduced. The same effect can be achieved by varying the power to the flame. Exit velocities of twice the speed of light (2M) are possible. For optimal density and porosity, however, speeds less than 1M are preferred.

Figure 6:
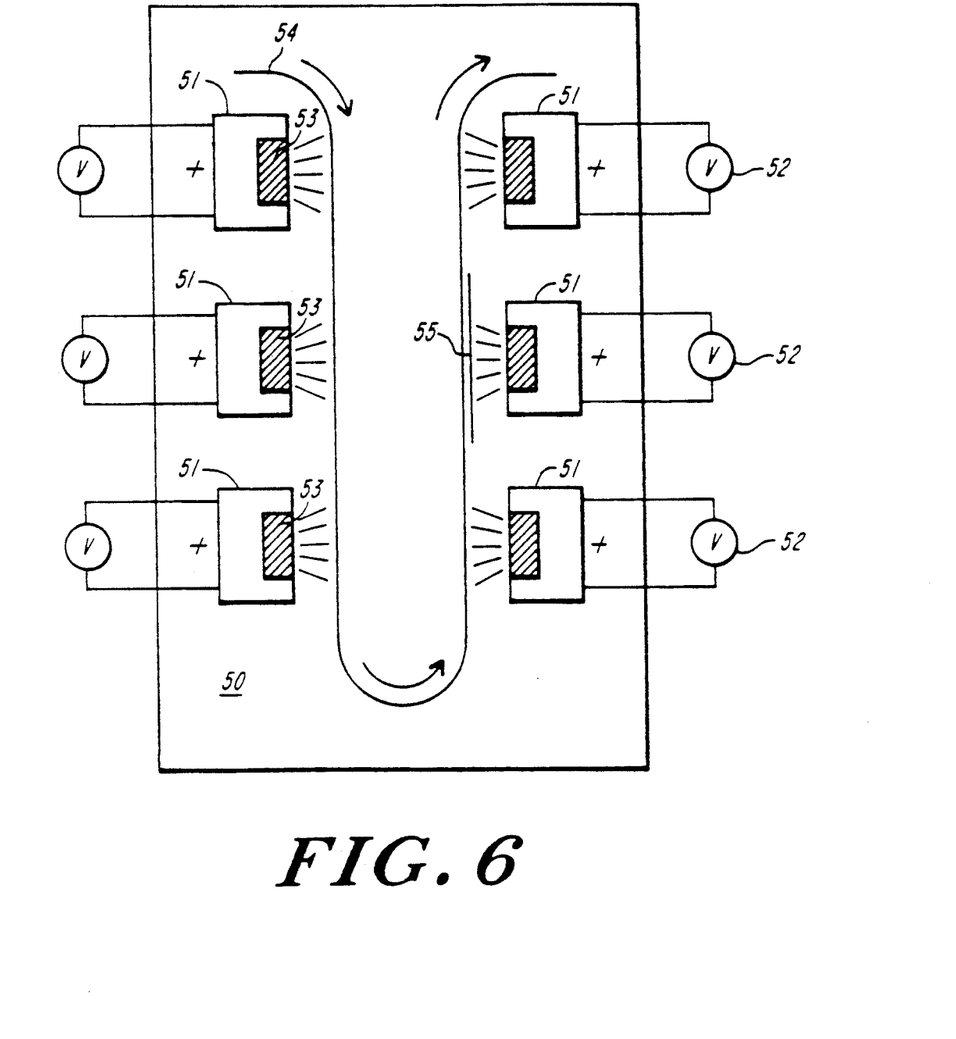
FIG. 6 shows magnetron sputtering of the activator coating of the catalyst of the present invention.

An activator is deposited onto the porous layer using chemical deposition or physical vapor deposition techniques. An activator accelerates the reaction rates of the catalyst. Magnetron sputtering is the preferred technique. Referring to FIG. 6, a deposition chamber 50 is supplied with multiple cathodes 51. Means of introducing an ionizable gas into the chamber 50 is provided (not shown). The cathodes 51 are independently connected to a voltage sources 52. Means are provided for producing a plasma (not shown). Each cathode 51 contains a magnet 53 to focus and accelerate the ionized plasma. A catalyst strip 54 is passed by each of the cathodes and deposition of the cathode material as an activator layer 55 occurs. Catalyst speed and cathode voltage control the rate and thickness of the deposition. Multi-layer deposition is possible. Also, the cathodes are not required to be of the same composition and mixed composition depositions are possible.

The deposited activator coating 55 has a large surface area because of the porosity of the porous layer on which it is applied. When the deposition is carried out in a vacuum or inert atmosphere, the deposited coating is a metal, preferably from the platinum group. A Pt coating as thin as 0.1 μm exhibits the necessary catalytic activity. This is compared to the 2–4 μm coatings required in known catalysts and represents a considerable savings in precious metal. When the deposition is carried out in air, the deposited coating is a metal oxide. When the deposition is carried out in a carburizing atmosphere, the deposited coating is a metal carbide. Using oxide and carbide activator coatings could eliminate the need for platinum group metals entirely. However, the most effective catalyst may well be a combination of all three.

A particularly effective activator coating in the reduction of $NO_x$ is a coating containing 60% WC and 40% MoC. These materials are particularly effective at higher temperatures (550°-800° C.). When it is necessary to have effective conversion at lower temperatures, an activator coating containing MoC, WC and $ZrO_2$ is used, since $ZrO_2$ is an effective oxidizer of $NO_x$ in the temperature range of 380°-600° C. As $ZrO_2$ is not stable at high temperatures, rare earth oxides are further added as stabilizers.

EXAMPLE

The adhesive sublayer was applied to a substrate of heat resistant steel (0.1% C; 15% Cr; 5% Al) 50 μm in thickness and 100 mm in width. Argon was used as the plasma forming gas and the plasma escape rate was 800±50 m/s. A Ni-Al composite powder (80% Ni; 20% Al) with a particle size of 20-50 μm was used to prepare the adhesive layer. The thickness of the applied adhesive layer was at least 20 μm.

The catalytically active layer was produced using simultaneously operating feeders having self-contained gears. Air was used as the plasma-forming gas and the plasma escape rate was less than 500 m/s (optimum 450±50 m/s). One feeder supplied the $Al_2O_3$ powder with a particle size of less than 10 μm (preferably 3-8 μm) and the other supplied composite a thermally reactive Ni-Al powder of the type used in the adhesive sublayer with particle size less than 80 μm (preferably 40-50 μm). The thickness of the catalytically active layer was not greater than 30 μm (preferably 20-25 μm). As the thickness of the layer increased, the amount of $Al_2O_3$ powder was increased linearly ranging from 0 wt % to 100 wt % and the amount of thermally reactive Ni-Al powder supplied by the other feeder was correspondingly linearly reduced such that the amount of powder supplied from the feeders remained constant.

There are two sources of alumina in the catalytically active layer. The majority of the alumina comes from the feed alumina in the second feeder. However, when air is the plasma-forming gas, some aluminum in the thermally reactive Ni-Al powders is also converted to alumina. Further control of the compositional gradient of the layer can therefore be achieved by introducing an oxygen gradient during deposition of the catalytically active layer.

Nickel from the thermally reactive Ni-Al powder melted and splat onto the substrate, while the alumina layer was vaporized during passing through the plasma torch. Alumina then condensed onto the nickel surface as small particles with high surface areas. Therefore, there was high degree of porosity throughout the catalytically active layer (See FIG. 4) even before the introduction of the pore-forming compounds. The alumina introduced through the second feeder did not vaporize to a significant extent because these larger particles had lower surface areas.

Then, the feeder containing thermally reactive Ni-Al powder was turned off and the spraying of alumina powder in combination with manganese carbonate powder ($MnCO_3$) (particle size <10 μm) began. The powder ratio of $Al_2O_3$ to $MnCO_3$ ranges from (1.5-2.0) to 1, whereby a surface area of 30 $m^2/g$ and higher was achieved. The heat treatment at 620±10° C. favored formation of such surface areas. Thermal treatment led to $MnCO_3$ decomposition to MnO and $CO_2$.

At a $\gamma$-$Al_2O_3$ $MnCO_3$ ratio of 1.5:1 the porosity was higher than 30 $m^2/g$, but it reduced the tensile strength of the coating and fracture was observed at the time of assembling. If the ratio was higher than 2:1, the porosity was lower than 30 $mm^2/g$.

EXAMPLE

A catalyst of NiAl sublayer, $\gamma$-$Al_2O_3$ catalytically active layer and $\gamma$-$Al_2O_3$/MnO porous layer was assembled by corrugating a catalyst strip and rolling it into a cylinder, the catalyst samples were typically 30 mm in length and 20-50 mm in diameter. A standard feed gas with a composition of 1% CO, 1% $CH_4$; 1% $H_2$ and 3% $O_2$ with $N_2$ comprising the balance was used. Feed gas was introduced into a chamber containing the catalyst samples. Four catalyst samples were heated from 100°-700° C. in 50° C. intervals (held for 10-15 min). At each interval, testing gases were monitored by gas chromatography. The conversion rates of the standard feed gas was determined and is reported in Table 1. Table 1 shows that the catalyst exceeds standards set by U.S. CO is effectively completely converted at 160° C. Hydrocarbons are 99% converted at 700° C.

TABLE 1

| T (°C.) | Volumetric Speed ($h^{-1}$) | Conversion (mol %) | | |
|---|---|---|---|---|
| | | $H_2$ | $CH_4$ | CO |
| 110 | 10,000 | 0 | 0 | 56-8 |
| 160 | 10,000 | 33.1 | 0 | 100 |
| 250 | 20,000 | 100 | 0 | 100 |
| 550 | 20,000 | 100 | 70.1 | 100 |
| 700 | 20,000 | 100 | 99.0 | 100 |

What is claimed is:

1. A multilayered article having catalytic activity that is highly resistant to thermal and mechanical shock, comprising:
   a metallic substrate;
   an adhesive sublayer diffusion bonded onto said substrate;
   a catalytically active layer deposited on said sublayer comprising a catalytically active component and constituent species of said sublayer, said catalytically active layer characterized by a smooth compositional gradient of said catalytically active component from substantially 0.0 wt % at said sublayer/catalytically active layer interface to substantially 100 wt % at an outermost portion of said catalytically active layer, the balance of said catalytically active layer comprising constituent species of said sublayer; and
   a porous layer deposited on said catalytically active layer, said porous layer having a large surface area and comprising said catalytically active component.

2. A multilayered article having catalytic activity that is highly resistant to thermal and mechanical shock useful for the conversion of waste gases from an internal combustion engine comprising:
   a metallic substrate;
   an adhesive sublayer comprising aluminum diffusion bonded onto said substrate;
   a catalytically active layer deposited on said sublayer comprising active alumina and constituent species of said sublayer, said catalytically active layer characterized by a smooth compositional gradient of active alumina from substantially 0.0 wt % at said sublayer/catalytically active layer interface to substantially 100 wt % at an outermost portion of said catalytically active layer, the balance of the catalytically active layer comprising constituent species of said sublayer; and
   a porous layer deposited on said catalytically active layer, said porous layer having a large surface area and comprising active alumina and metal oxides.

3. The catalyst of claim 1 or 2 wherein the thickness of said adhesive layer is less than 100 μm.

4. The catalyst of claim 1 wherein said sublayer comprises an intermetallic compound.

5. The catalyst of claim 4 wherein said intermetallic compound is selected from the group containing intermetallic compounds prepared from nickel and titanium, aluminum and one or more of Co, Cr, Mo, Ta, Nb, Ti or Ni or silicon with one or more of Ti, Nb, Cr, W, Co, Mo, Ni or Ta.

6. The catalyst of claim 2 wherein said sublayer comprises an intermetallic aluminum compound.

7. The catalyst of claim 6 wherein said intermetallic aluminum compound is selected from the group containing intermetallic aluminum compounds prepared from aluminum and one or more of Co, Cr, Mo, Ta, Nb, Ti or Ni.

8. The catalyst of claim 6 wherein said intermetallic aluminum compound comprises nickel and aluminum.

9. The catalyst of claim 1 or 2 wherein the thickness of said catalytically active layer is in the range of 20–50 $\mu$m.

10. The catalyst of claim 2 wherein said active alumina comprises $\epsilon$-alumina.

11. The catalyst of claim 2 wherein said active alumina comprises amorphous alumina.

12. The catalyst of claim 1 or 2 wherein said compositional gradient follows a linear function.

13. The catalyst of claim 1 or 2 wherein said compositional gradient follows an exponential function.

14. The catalyst of claim 2 wherein the catalytically active layer further comprises stabilizers to impart thermal stability to said active alumina.

15. The catalyst of claim 14 wherein said stabilizers are selected from the group containing CaO, $Cr_2O_3$, $Mn_xO_y$, $ZrO_2$, $SnO_2$, $Ti_xO_y$, $Si_xO_y$ and oxides of rare earth elements.

16. The catalyst of claim 1 or 2 wherein said catalytically active layer contains two or more catalytically active components to enhance or broaden the catalytic activity of said catalyst.

17. The article of claim 16 wherein said catalytically active compounds include metal oxides, transition metal carbides and free carbon.

18. The article of claim 17 wherein said metal oxide is selected from the group containing $Al_2O_3$, $ZrO_2$, $Ce_2O_3$, $SNO_2$, $MgO$, $Mn_xO_y$, $Ti_xO_y$, $Cr_2O_3$, $Co_2O_3$, $Cu_xO_y$, $Fe_2O_x$, $NiO$, $BaO$, $V_2O_5$, oxides of rare earth elements, complex spinel oxides and perovskite-type oxides.

19. The article of claim 17 wherein said transition metal carbide includes tungsten carbide and molybdenum carbide.

20. The article of claim 1 or 2 wherein said porous layer has a surface area in the range of 30 to 50 $m^2/g$.

21. The article of claim 1 or 2 wherein the thickness of said porous layer is substantially one-third the thickness of said catalytically active layer.

22. The article of claim 1 or 2 further comprising an activator coating deposited on said porous layer.

23. The article of claim 22 wherein said activator is selected from the group consisting of Group VII metals and their alloys, metal oxides, metal carbides and zeolites.

24. The article of claim 1 or 2 wherein said article is corrugated.

25. The article of claim 1 or 2 wherein said article is perforated.

26. A method of preparing a multilayered article useful for the conversion of waste gases from an internal combustion engine comprising the steps of:

(a) introducing a thermally reactive powder into a plasma torch, thereby initiating an exothermic reaction within said thermally reactive powder;

(b) depositing said exotherming powders on a substrate, said exothermic reaction occurring substantially on the surface of said substrate and resulting in diffusion of said exotherming powders into said substrate and formation of a diffusion bonded layer having superior adhesion to said substrate;

(c) introducing at least alumina and a second powder into said plasma torch at separately controllable variable feed rates said second powder comprising said thermally reactive powder;

(d) co-depositing alumina and said second powder onto said diffusion bonded layer, the relative feed rates of said alumina and second powder being adjusted during deposition to obtain a catalytically active layer characterized by a smooth compositional gradient of alumina from substantially 0 wt% at the diffusion bonded layer/catalytically active layer interface to substantially 100 wt% at an outermost portion of said catalytically active layer;

(e) introducing at least alumina and a pore-forming compound into said plasma torch and co-depositing at least alumina and said pore-forming compound onto said catalytically active layer, such that said pore-forming compound decomposes with a release of gas or vapor resulting in a porous layer with a high surface area.

27. The method of claim 26 wherein said pore-forming compound is selected from the group containing metal carbonates and metal hydroxides.

28. The method of claim 27 wherein said metal carbonates are selected from the group consisting of $MgCO_3$, $Na_2CO_3$, $MnCO_3$ and rare earth carbonates.

29. The method of claim 27 wherein said metal hydroxides are selected from the group consisting of $Mn(OH)_2$ and $Al(OH)_3$.

30. The method of claim 26 wherein the ratio of said catalytically active component to said pore-forming compound is in the range of 1.5 to 2.0.

31. The method of claim 26 wherein said diffusion bonded layer is deposited in an inert atmosphere.

32. The method of claim 26 wherein said inert atmosphere contains less than 0.001 wt % oxygen.

33. The method of claim 26 wherein said adhesive layer is deposited in air.

34. The method of claim 26 wherein said thermally reactive powder is selected from the group containing composite powders prepared from aluminum and one or more of Co, Cr, Mo, Ta, Nb, Ti or Ni.

35. The method of claim 26 wherein said thermally reactive powder comprises an aluminum-coated metal.

36. The method of claim 26 wherein said thermally reactive powder comprises aluminum-coated nickel.

37. The method of claim 26 wherein said catalytically active layer is deposited in air.

38. The method of claim 26 wherein said catalytically active layer is deposited in a controlled oxygen environment.

39. The method of claim 38 wherein means are provided for adjusting the oxygen content of said controlled oxygen environment during deposition of said catalytically active layer.

40. The method of claim 26 wherein particle sizes of powders used in deposition of said catalytically active and porous layers are selected to control porosity of said layers.

41. The method of claim 26 wherein the exit velocity from said plasma torch of powders used in deposition of said catalytically active and porous layers is selected to control the porosity of said layers.

42. The method of claim 41 wherein said exit velocity of said powders is controlled by adjusting a flame power and a flame temperature of said plasma torch.

43. The method of claim 41 wherein said exit velocity of said powders is controlled by introducing said powders into a hot zone or a cool zone of the flame.

44. The method of claim 26 wherein additional catalytically active component powders are co-deposited with alumina and said second powder in said catalytically active layer.

45. The method of claim 44 wherein said additional catalytically active components are selected from the group consisting of metal oxides and metal carbides.

46. The method of claim 25 wherein stabilizer powders are co-deposited with alumina and said second powder in said catalytically active layer.

47. The method of claim 44 or 46 wherein said powders are introduced intimately mixed with alumina.

48. The method of claim 44 or 46 wherein said powders are introduced from a separate feeder.

49. The method of claim 35 wherein said pore-forming compound of said porous layer is introduced into a cool zone of said plasma torch.

50. The method of claim 26, further comprising the step of:
depositing an activator layer on said porous layer.

51. The method of claim 50 wherein said activator is selected from the group consisting of Group VIII metals and their alloys, metal oxides, metal carbides and zeolites.

52. The method of claim 50 wherein said activator layer is deposited using a method selected from the group consisting of chemical deposition, plasma spray deposition and physical vapor deposition.

53. The method of claim 52 wherein said physical vapor deposition method is magnetron sputtering, and said deposition is carried out in a non-oxidizing atmosphere to deposit metals.

54. The method of claim 52 wherein said physical vapor deposition method is magnetron sputtering, and said deposition is carried out in an oxygen-containing atmosphere to deposit metal oxides.

55. The method of claim 53 or 54 wherein multiple cathodes provided and said multilayered article is moved sequentially past each electrode to deposit an increasingly thicker layer of activator.

56. The method of claim 53 or 54 wherein said thickness is controlled mainly by the speed of said catalyst and cathode voltage.

57. The method of claim 55 wherein multi-layer deposition is realized by using cathodes of different composition.

58. The method of claim 50 wherein said deposition is carried out in a carburizing atmosphere to deposit metal carbides.

59. The catalyst of claim 2 wherein said metal oxides are selected from the group consisting of MgO, $Mn_xO_y$ and oxides of rare earth elements.

* * * * *

UNITED STATES PATENT AND TRADEMARK OFFICE
CERTIFICATE OF CORRECTION

PATENT NO. : 5,204,302
DATED : April 20, 1993
INVENTOR(S) : Igor V. Gorynin, Boris V. Farmakovsky, Alexander P. Khinsky, Karina V. Kalogina, Alfredo Riviere, V., Julian Szekely, and Navtej S. Saluja It is certified that error appears in the above-indentified patent and that said Letters Patent is hereby corrected as shown below:

Column 3, line 1: please delete ":" and insert therefor -- → --;

Column 9, line 42: after "was" and before "high" please insert -- a --;

Column 11, line 20: delete "$\epsilon$" and insert therefor -- $\gamma$ --;

Column 12, line 12: after "rates" please insert -- , --;

Column 11, line 44: delete "SNO $_2$" and insert therefor -- $SnO_2$ --.

Signed and Sealed this

Nineteenth Day of April, 1994

*Attest:*

BRUCE LEHMAN

*Attesting Officer*   *Commissioner of Patents and Trademarks*